US012559153B2

(12) United States Patent
Van Welie et al.

(10) Patent No.: US 12,559,153 B2
(45) Date of Patent: Feb. 24, 2026

(54) SHOPPING CONTAINER SECURITY SYSTEM

(71) Applicant: Rocateq USA, LLC, Valencia, CA (US)

(72) Inventors: Dirk Jan Van Welie, Amsterdam (NL); Leendert-Jan Pasterkamp, Nunspeet (NL)

(73) Assignee: Rocateq USA, LLC, Valencia, CA (US)

( * ) Notice: Subject to any disclaimer, the term of this patent is extended or adjusted under 35 U.S.C. 154(b) by 10 days.

(21) Appl. No.: 18/747,960

(22) Filed: Jun. 19, 2024

(65) Prior Publication Data

US 2024/0425096 A1    Dec. 26, 2024

Related U.S. Application Data

(60) Provisional application No. 63/509,480, filed on Jun. 21, 2023.

(51) Int. Cl.
| | |
|---|---|
| *B62B 5/04* | (2006.01) |
| *G08B 13/22* | (2006.01) |
| *H04N 7/18* | (2006.01) |

(52) U.S. Cl.
CPC ............ *B62B 5/0423* (2013.01); *G08B 13/22* (2013.01); *H04N 7/188* (2013.01)

(58) Field of Classification Search
CPC .. B62B 5/0423; G08B 13/22; G08B 13/2488; G08B 13/2462; G08B 15/00; G08B 13/2482; H04N 7/188
See application file for complete search history.

(56) References Cited

U.S. PATENT DOCUMENTS

| | | | |
|---|---|---|---|
| 8,464,843 | B2 | 6/2013 | Qiu et al. |
| 2005/0258975 | A1 | 11/2005 | Hunt |

(Continued)

FOREIGN PATENT DOCUMENTS

| | | |
|---|---|---|
| CN | 101556725 | 10/2009 |
| GB | 2367169 | 3/2002 |
| WO | 2024263645 | 12/2024 |

OTHER PUBLICATIONS

"International Application Serial No. PCT US2024 034625, International Search Report mailed Oct. 24, 2024", 3 pgs.

(Continued)

*Primary Examiner* — Daryl C Pope
(74) *Attorney, Agent, or Firm* — Schwegman Lundberg & Woessner, P.A.

(57) ABSTRACT

Disclosed herein are computer-implemented methods and systems to facilitate prevention or detection of theft of an item in a shopping container. A controller attached to the shopping container receives a first signal from a first transmitter upon entry of the shopping container into a first area within a store. A second signal is received by the controller from a second transmitter upon entry of the shopping container into a second area within the store. After receiving the second signal, the controller receives the first signal again without having received a third signal associated with a third area within the store. In response to receiving the first signal again without having received the third signal after receipt of the second signal, the controller automatically causes switching from a normal mode to an anti-theft mode associated with the controller.

18 Claims, 5 Drawing Sheets

(56)                          References Cited

U.S. PATENT DOCUMENTS

2018/0154918 A1 *   6/2018   Hannah ................... B62B 5/048
2020/0079412 A1 *   3/2020   Ramanathan ........ G07G 1/0081

OTHER PUBLICATIONS

"International Application Serial No. PCT US2024 034625, Written Opinion mailed Oct. 24, 2024", 6 pgs.

* cited by examiner

SHOPPING CONTAINER SECURITY SYSTEM

CLAIM OF PRIORITY

This application claims the benefit of priority to U.S. Patent Application Ser. No. 63/509,480, filed on Jun. 21, 2023, which is incorporated herein by reference in its entirety

TECHNICAL FIELD

Subject matter disclosed herein relates, generally, to shopping container security. More specifically, the subject matter relates to systems and methods for facilitating prevention or detection of theft of items in shopping containers, such as shopping carts.

BACKGROUND

Many current stores, such as supermarkets, grocery stores, convenience stores, or retail stores, experience product theft. It often happens that thieves use a shopping container, such as a shopping cart, to illegally remove stolen items (e.g., heavy items or large quantities of items) from a store. Theft can be reduced by preventing shopping containers from leaving a store before the items in the shopping containers are purchased or by making it more challenging to remove shopping containers from the store before such items are purchased.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
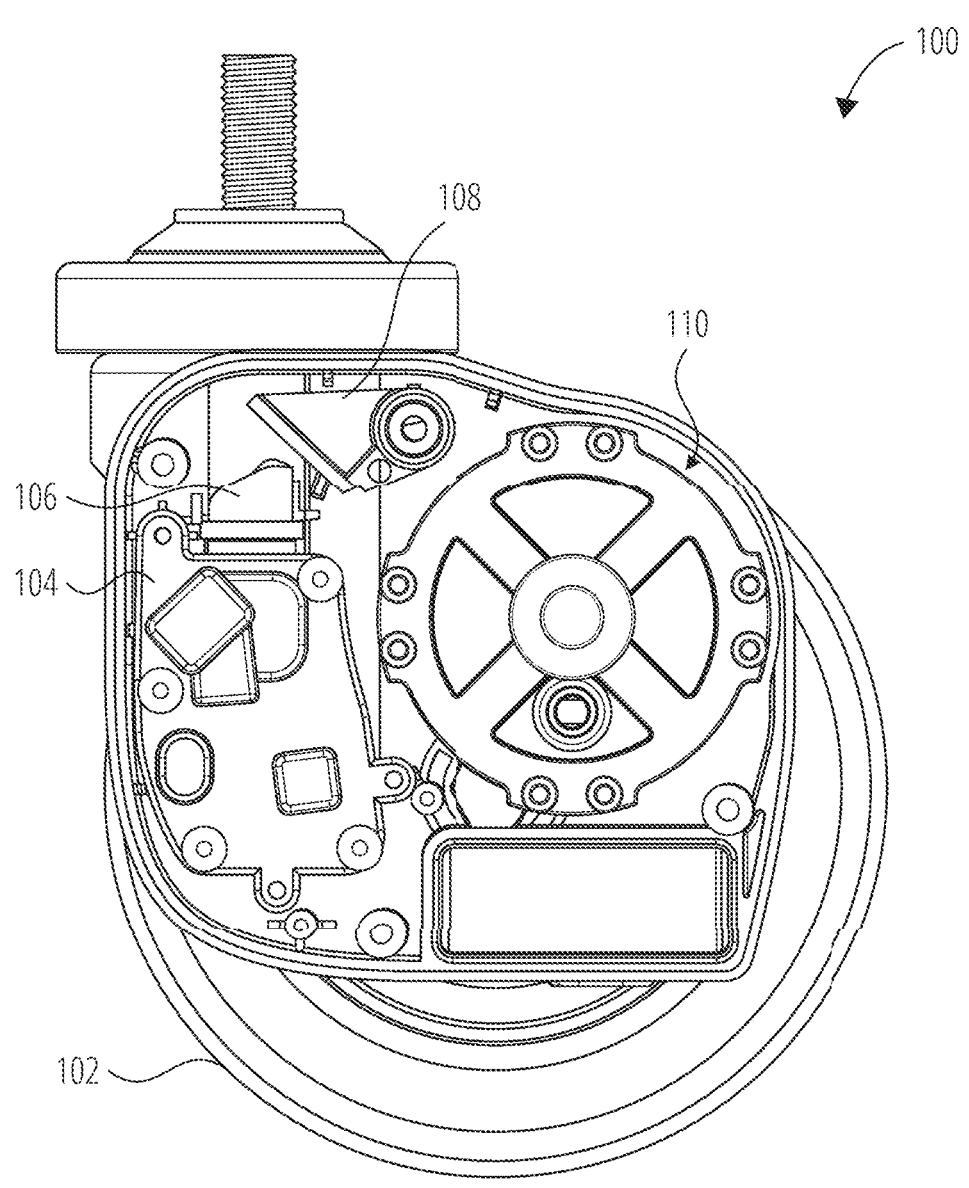
FIG. 1 illustrates a caster for a shopping cart, according to some examples.

Examples described herein provide methods and systems for facilitating prevention or detection of theft of one or more items. In some examples, a shopping container is fitted with a controller that can switch between a normal mode and an anti-theft mode. For example, movement of a shopping container (e.g., a shopping cart) is managed or controlled by using a mobility control mechanism, such as a caster or a wheel locking/braking mechanism, that can alter the mobility of the shopping container. A sequence and type of signals received at the shopping container may be monitored to determine its movement through different zones in a pre-defined area, and to selectively enter the anti-theft mode (e.g., to change the mobility of the shopping container).

In some examples, the controller is provided by a caster of a shopping cart. The caster can selectively restrain or allow rotation of a wheel of the caster.

The controller receives a first signal from a first transmitter upon entry of the shopping container into a first area (or first designated zone) within a store. The first area may be a products area. A second signal is received by the controller from a second transmitter upon entry of the shopping container into a second area (or second designated zone) within the store. The second area may be a products area.

In some cases, after receiving the second signal, the controller receives the first signal again without having received a third signal associated with a third area (or third designated zone) within the store. The third area may be a checkout area or payment area. In response to receiving the first signal again without having received the third signal after receipt of the second signal, the controller automatically switches from a first mode to a second mode. The first mode may be a normal mode, while the second mode is an anti-theft mode. In some examples, the term "normal mode" means that the controller is in a state in which the associated shopping container is intended to be used normally (e.g., no anti-theft mechanism or alarm is active).

In some examples, where the controller is provided by a caster of a shopping cart, entering the anti-theft mode causes restraining or substantially preventing the rotation of the wheel associated with the caster. The anti-theft mode may thus be a high-friction mode, a high-resistance mode, or a locking mode of the caster. Accordingly, a mobility control mechanism (e.g., the caster) may be triggered to adjust the mobility of the shopping cart if it receives the first signal again without having received the third signal.

In some examples, the controller is configured to remain in the normal mode (e.g., allow the wheel to rotate normally or freely) when it receives the first signal again after having received the third signal upon entry of the shopping container into the third area within the store. The third signal may be transmitted by a third transmitter.

Accordingly, in some examples, a sequence in which two or more of the first signal, the second signal, and the third signal is obtained at the shopping container (e.g., at the controller) while the shopping container is in the store determines whether the anti-theft mode will be entered automatically upon exiting (or upon nearing an exit of) the store.

The first signal, the second signal, and the third signal may all be signals that are wirelessly received by the controller. In some examples, the first transmitter, the second transmitter, and the third transmitter are wireless signal transmitters installed at the store (e.g., above a floor level and below a ceiling level of an area in which the shopping container travels). Accordingly, the first signal, the second signal, the third signal, or any combination thereof may be a wireless signal. In some examples, the first signal, the second signal, the third signal, or any combination thereof is a wired signal.

The first signal, the second signal, and the third signal may be different signals (e.g., different radio frequency (RF) signals), but of the same or substantially the same frequency. In other words, the first signal, the second signal, and the third signal have different payloads (and can thus be interpreted as distinct signals by a controller, processor, or receiver) but may be transmitted using the same frequency.

The frequency may be an ultra high frequency (UHF), such as 2.4 gigahertz (GHz), or a super high frequency (SHF), such as 5.8 GHz. In various examples, the first signal, the second signal, the third signal, or any combination thereof has a frequency of about 2.4 GHz. In other examples, the first signal, the second signal, the third signal, or any combination thereof has a frequency of about 5.8 GHZ.

In some examples, the first signal, the second signal, the third signal, or any combination thereof has a frequency of at least about 1.6 GHZ, 1.8 GHz, 2 GHZ, 2.2 GHZ, 2.4 GHz, 2.6 GHz, 2.8 GHz, 3 GHZ, 3.2 GHZ, 3.4 GHz, 3.6 GHz, 3.8 GHz, 4 GHZ, 4.5 GHZ, 5 GHz, 5.5 GHZ, 5.8 GHz, 6.5 GHZ, 7 GHZ, or more, including increments therein. In some examples, the first signal, the second signal, the third signal, or any combination thereof has a frequency of at most about 1.6 GHZ, 1.8 GHz, 2 GHZ, 2.2 GHZ, 2.4 GHz, 2.6 GHz, 2.8 GHz, 3 GHz, 3.2 GHZ, 3.4 GHz, 3.6 GHz, 3.8 GHz, 4 GHZ, 4.5 GHZ, 5 GHz, 5.5 GHZ, 5.8 GHz, 6.5 GHz, 7 GHZ, or more, including increments therein.

In some examples, the first signal, the second signal, the third signal, or any combination thereof has a frequency of about 315 MHz, 433 GHZ, 868 MHZ, or 918 MHZ.

In some examples, the first signal, the second signal, the third signal, or any combination thereof, are communicated using a communication protocol such as Enhanced Shock-Burst™ (ESB) or Bluetooth™.

In some examples, the first signal, the second signal, the third signal, or any combination thereof comprises an amplitude modulated (AM) signal.

In some examples, the system operates in an Industrial, Scientific, and Medical (ISM) band, such as the 2.4 GHz ISM band, eliminating the need to request a transmission license for use. In some examples, the use of, for example, 2.4 GHz frequency signals or 5.8 GHZ frequency signals eliminates the need to install entrance and/or exit loops to detect the proximity of a shopping container.

In some examples, a signal receiving device or unit is communicatively coupled to the controller to allow it to receive signals. The controller may actuate a motor of a mobility control mechanism, such as a caster, to lock or unlock, or restrain or allow, rotation of a wheel of a shopping cart.

In some examples, at least one wheel of the shopping cart forms part of a caster that includes or is communicatively coupled to the controller. The caster may include one or more processors. The one or more processors may cause execution of functions of, for example, the controller.

In some examples, during operation, when the shopping container enters the store, receipt of the first signal empties a memory associated with the controller (e.g., a memory of a caster) and initiates instruction of the controller to search for the second signal. In some examples, receiving the first signal does not trigger an event or mode change of the controller. In some examples, the second signal, the third signal, or both are stored in a memory associated with the controller.

In some examples, a range of the first transmitter, the second transmitter, the third transmitter, or any combination thereof is adjustable to ensure that the first signal, the second signal, the third signal, or any combination thereof are only received in desired zones or areas. In some examples, a range of the first transmitter, the second transmitter, the third transmitter, or any combination thereof is adjustable to ensure that two or more of the first signal, the second signal, and the third signal, are not being received by the signal receiving device of the shopping container simultaneously during operation.

Examples described herein may be implemented to prevent shopping containers, such as shopping carts or other containers (e.g., shopping baskets) from exiting a store before items are purchased or to reduce the frequency of such incidents. Furthermore, the occurrence of unauthorized removal of shopping containers themselves from store environments can be prevented or reduced.

In some examples, transmitters are installed at strategic locations, such as store entrances and/or exits, products areas, and checkout areas, allowing a controller to receive a specific sequence of signals that is used to automatically determine whether to enter an anti-theft mode (e.g., that locks, applies a braking force to, or restrains a wheel, or that triggers an audible alarm). For example, when an individual attempts to exit the store after having been in a products area but without having visited a checkout area, a wheel restraining mechanism is automatically triggered. Furthermore, an alarm can be activated and/or the incident can be automatically captured (e.g., by a video camera installed in the store) and stored.

Examples described herein address technical problems associated with shopping container security systems that rely on multiple different signal frequencies. Such systems can be complex or expensive, or can lack reliability in a busy store environment, e.g., as a result of interference or other communication issues. In some examples, the ranges of transmitters are specifically adjusted to ensure that a controller at a shopping container does not receive two or more of the first signal, the second signal, or the third signal at the same time. Examples in the present disclosure may reduce false alarms, enhance the reliability of a shopping container security system, and provide a more seamless experience. Furthermore, techniques described herein allow for efficient and automatic resetting of controller statuses, enhancing overall system efficiency.

In some cases, a customer may enter a store environment and leave relatively quickly, without entering a main shopping area. For example, in certain store environments, such as supermarkets, entrance areas often host smaller, specialized shops or services, including, for example, florists, banks, or pharmacies, that are not part of the main shopping area. Customers wishing to use these services quickly may not necessarily enter the main shopping area of the store environment. Instead of triggering an anti-theft mode automatically (e.g., restraining a shopping cart wheel) if the shopping container did not reach the main shopping area and is not returned within a short window of time (e.g., 3 minutes or 5 minutes), examples in the present disclosure utilize strategic placement and specific system configurations to obviate the need for such a timer-based approach, while enabling shopping containers to enter and exit such areas without unnecessarily triggering anti-theft mechanisms.

As mentioned, in some examples, a controller is provided by a caster. A caster is a type of wheel assembly that can be mounted to a base of a shopping cart to allow it to move smoothly across a floor. A caster can also be configured to selectively restrain and allow, or lock and unlock, rotation of a wheel of the caster. Different designs have been developed for this purpose.

FIG. 1 illustrates a caster 100 for a shopping cart, according to some examples, that is configured to selectively restrain or apply a braking effect to a wheel 102. The caster 100 is thus an example of a mobility control unit that can be used to selectively adjust mobility of a wheeled container.

In addition to the wheel 102, the caster 100 includes a controller 104. The controller 104 includes one or more processors and one or more memory components (not shown) storing instructions, configurations, and/or statuses.

The controller 104 may include or be communicatively coupled to a signal receiving device of the caster 100. In some examples, the caster 100 also includes a signal transmitting device, which may be provided by the same device as the signal receiving device. For example, the caster 100 can include an RF module for receiving and/or transmitting RF signals. In some examples, the RF module operates at a 2.4 GHz frequency.

The caster 100 further includes a motor 106, a wheel lock 108, and a damper element 110. In some examples, the controller 104 controls the motor 106 to cause restraining or inhibiting rotation of the wheel 102. The controller 104 can control the motor 106 to displace the wheel lock 108 so as to engage with the damper element 110, which is mechanically coupled to the wheel 102, thereby preventing or substantially preventing rotation thereof.

The caster 100 may include one or more shafts, axles, gears, washers, bearings, or combinations thereof to transfer power between the wheel 102, the damper element 110, and the wheel lock 108. It is noted that the controller 104, the motor 106, the wheel lock 108, and the damper element 110 are typically enclosed by a cover or frame element of the caster 100, and that the caster 100 is depicted without such a cover or frame element in FIG. 1 merely to illustrate certain exemplary parts of the caster 100. Furthermore, the caster 100 may include an electrical power source, such as a battery, for powering the controller 104 and the motor 106.

Accordingly, the caster 100 can be selectively adjusted between a normal mode and an anti-theft mode. In the normal mode, the damper element 110 and/or other components provide no restriction with respect to the wheel 102, and the wheel 102 can rotate freely. When the controller 104 receives a particular signal or sequence of signals (as described in greater detail elsewhere), the controller 104 causes the motor 106 to actuate the wheel lock 108 to adjust the caster 100 to the anti-theft mode.

In some examples, in the anti-theft mode, when a user attempts to push the shopping cart to which the caster 100 is mounted, force is transferred from the wheel 102 to the damper element 110 and the wheel lock 108 such that further rotation of the wheel 102 is restricted, prevented, or substantially prevented. It is noted that, in some examples, the shopping cart does not stop abruptly upon entering the anti-theft mode while moving, but a strong braking effect is created via the restraining mechanism of the caster 100. In some examples, a shopping cart has four or more wheels, with at least one of the wheels being provided in a caster such as the caster 100 of FIG. 1. Even though rotation of other wheels may still be unrestricted, restraining of the wheel 102 of the caster 100 can cause such a high-friction or high-resistance state with respect to the wheel 102 that it affects the shopping cart as a whole and makes it difficult to move.

Different types of caster mechanisms may be employed for restraining and allowing, or locking and unlocking, rotation of a wheel. Non-limiting examples of caster components and configurations, as well as the restraining of a wheel by a caster, are provided, for example, in U.S. Pat. No. 8,464,843.

In some examples, the caster 100 (e.g., the controller 104) is programmed (e.g., by suitable firmware) to facilitate prevention of theft. The caster 100 receives various signals from in-store transmitters. Different signals carry distinct payloads that instruct the caster 100 on how to operate. In some examples, the caster 100 is configured to receive a first signal that activates a search for a second signal and/or resets the caster 100, a second signal that logs presence of the shopping cart in a particular area (e.g., a products area), and a third signal that clears logging of the second signal.

Merely for ease of reference, in non-limiting examples below, the first signal received at a shopping container (e.g., by the controller 104) is referred to as the "A" signal, the second signal as the "X" signal, and the third signal as the "B" signal.

In some examples, the signals are wireless signals. The caster 100 (e.g., the controller 104) is programmed (e.g., by the firmware) to decode the signals and distinguish between them based on their payloads. Based upon the signal received at a particular point in time, or the sequence in which consecutive signals are received, the caster 100 performs predefined actions, such as logging the presence of the shopping cart in a sensitive area, activating the restraining or locking mechanism, or resetting the system post-checkout. The caster 100 may further be programmed to transmit one or more signals. For example, in response to restraining or locking the wheel 102 or detecting a signal that will cause wheel-restraining or wheel-locking, the caster 100 transmits a wireless alarm signal (e.g., via its RF module). In some examples, at least some of the signals are encrypted.

As mentioned, a caster is an example of a mobility control unit. A mobility control unit can control the mobility of a shopping cart based on signals received. In particular, in some examples, mobility can be controlled based on the shopping cart's movement pattern relative to predetermined areas or zones, and movement can be enabled and disabled selectively under certain conditions, or based on certain triggers.

Figure 2:
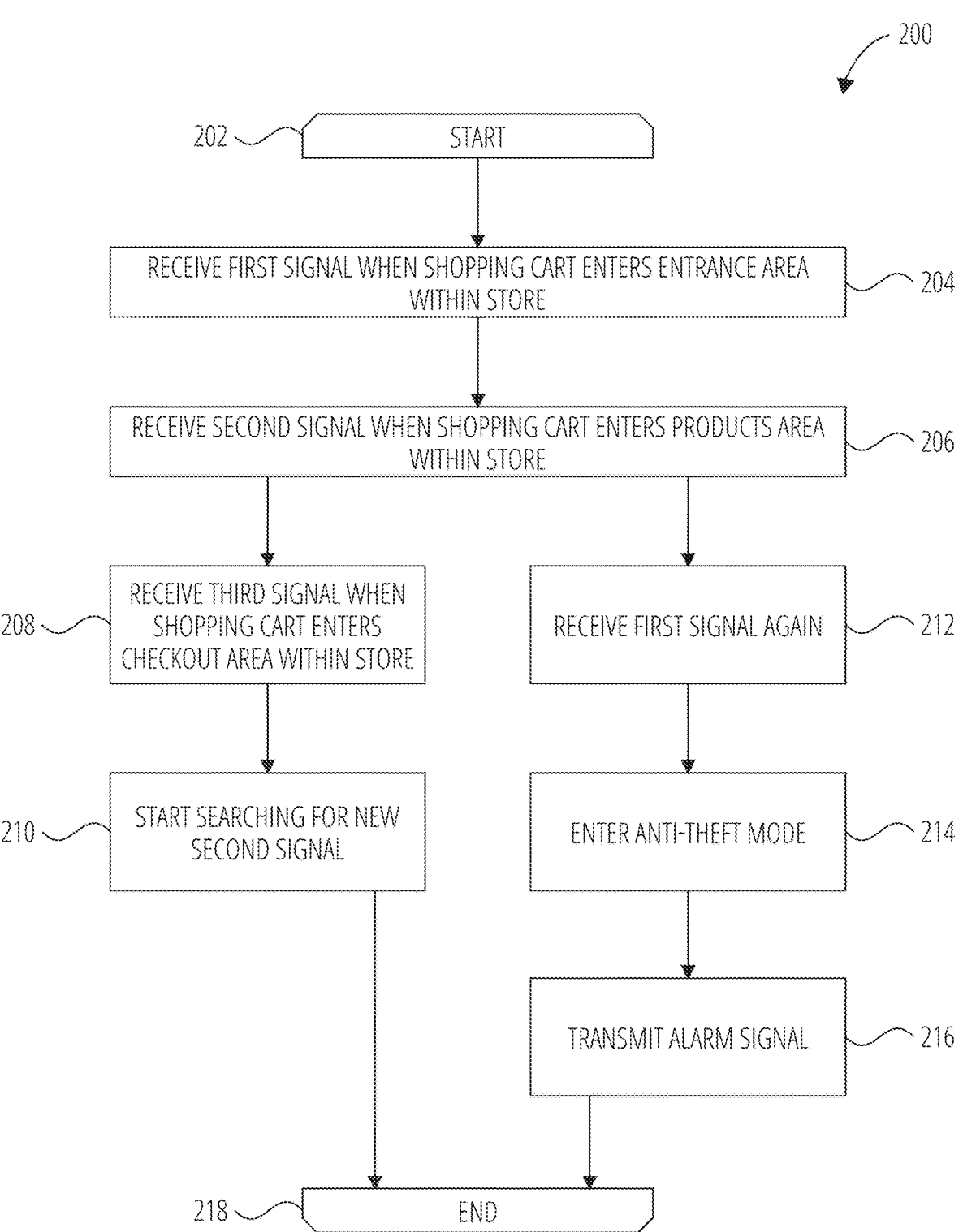
FIG. 2 is a flowchart illustrating a method suitable for facilitating prevention of theft of an item in a shopping container, according to-some examples.

FIG. 2 illustrates a method 200 suitable for facilitating prevention of theft of an item in a shopping container, according to some examples. The method 200 may be performed by the caster 100 of FIG. 1 (e.g., by the controller 104 and/or one or more other components of the caster 100), and the caster 100 and its associated shopping cart are thus referenced in the description below. However, it will be appreciated that one or more operations in the method 200 may also be performed using other devices or systems that are configured for switching from a normal mode to an anti-theft mode. For example, a shopping container may be a shopping basket (e.g., a hand-carried basket) that is fitted with a controller that can enter an anti-theft mode to trigger an alarm (e.g., at the shopping basket or at a remote alarm system) instead of adjusting operation of a wheel. At least some aspects of the method 200 may thus be performed by other types of shopping containers.

The method 200 commences at opening loop operation 202, and proceeds to operation 204 in which the caster 100 (e.g., the controller 104 thereof) receives a first signal (e.g., the A signal) from a first transmitter upon entry of the shopping cart into an entrance area within a store. For example, a user pushes the shopping cart that is fitted with the caster 100 into the store. At this stage, the caster 100 is in the normal mode and all wheels of the shopping cart rotate freely.

The first transmitter is located at or near the entrance area, and the caster 100 (e.g., the controller 104 thereof) receives the first signal. Where a store has separate entrance and exit areas, a similar first transmitter may also be located at or near the exit area. The first signal may be a 2.4 GHz signal. In some examples, once the caster 100 receives the first signal, it automatically starts a monitoring cycle in which it checks or searches for a second signal (e.g., the X signal).

At operation 206, the caster 100 (e.g., the controller 104 thereof) receives a second signal (e.g., the X signal) from a second transmitter upon entry of the shopping cart into a products area within the store. The second signal may be a 2.4 GHz signal. For example, the user pushes the shopping cart from the entrance area and into the products area. The second transmitter is located at or near the products area. In some examples, once the caster 100 (e.g., the controller 104 thereof) receives the second signal, it updates its memory to log receipt of the second signal. This changes the status of the caster 100 (e.g., in a memory managed by the controller 104) from, for example, "searching for the X signal" to "X signal received."

In the method 200, entering of the anti-theft mode is dependent on which signal the caster 100 receives after having received the second signal. Operation 208 indicates that, in some cases, the caster 100 (e.g., the controller 104 thereof) receives a third signal (e.g., the B signal) from a third transmitter after receiving the second signal and upon entry of the shopping cart into a checkout area within the store. If the caster 100 (e.g., the controller 104 thereof) detects receipt of the third signal after already having received the second signal, it updates its memory to log receipt of the third signal. The third signal may be a 2.4 GHz signal.

In such cases, the caster 100 will not enter the anti-theft mode and will remain in the normal mode. For example, the caster 100 does not restrain the rotation of the wheel 102 if the user proceeds from the checkout area back to the entrance area (or an exit area) where the caster 100 (e.g., the controller 104 thereof) receives the first signal again. In other words, the caster 100 is configured to permit rotation of the wheel 102 to continue in response to receiving the first signal again after having received the third signal upon entry of the shopping cart into the checkout area within the store. The user is free to leave the store normally and the method 200 concludes at closing loop operation 218.

Table 1 below illustrates such a sequence, identified as "Sequence A" (e.g., A→X→B→A), which does not result in the entering of the anti-theft mode.

In some examples, receipt of the B signal results in the caster 100 clearing a logged X signal from memory. In some examples, and as shown at operation 210, after operation 208 in which the third signal is received, the caster 100 (e.g., the controller 104 thereof) starts searching for a new second signal and stays in the normal mode. For example, this changes the status of the caster 100 (e.g., in a memory managed by the controller 104) back to, for example, "searching for the X signal."

On the other hand, and as indicated by operation 212 in FIG. 2, in some cases, the caster 100 (e.g., the controller 104 thereof) receives the first signal again after receiving the second signal, and without having received the third signal in the intervening period following the second signal. For example, the user pushes the shopping cart from the products area (where the X signal was received) back into the entrance area (or an exit area) where the caster 100 (e.g., the controller 104 thereof) receives the A signal again. The method 200 then proceeds to operation 214, where the caster 100 (e.g., the controller 104 thereof) automatically switches to the anti-theft mode to prevent the shopping cart from exiting the store area (or to make it more difficult to do so) without having passed through the checkout area. Table 1 below illustrates such a sequence, identified as "Sequence B" (e.g., A→X→A), which results in the entering of the anti-theft mode. In some examples, the caster 100 (e.g., the controller 104 thereof) updates its status to reflect the anti-theft mode.

In some examples, and as shown at operation 216 of FIG. 2, in response to entering the anti-theft mode, the caster 100 automatically transmits an alarm signal. The alarm signal may be a 2.4 GHz signal. As described elsewhere, since the signals that trigger the anti-theft mode indicate a potential attempt to remove items from the store without paying, the alarm signal can automatically trigger actions by one or more other components of a shopping container security system installed in the store (e.g., a control unit that is in wireless communication with the caster 100). The method 200 concludes at closing loop operation 218.

As mentioned, in some examples, all signals received as part of the method 200 are transmitted at the same or substantially the same 2.4 GHz frequency (or another frequency, such as 5.8 GHz). For example, the A signal, the X signal, and the B signal, are all transmitted at 2.4 GHz, but carry different sets of data bits (which may be encrypted) that the caster 100 can recognize to distinguish between them. This can serve to simplify system design and reduce potential technical issues. This approach may also streamline hardware requirements for transmitters and casters or other hardware.

TABLE 1

| | example signal sequences | |
|---|---|---|
| # | Sequence A-<br>anti-theft mode<br>not triggered | Sequence B-<br>anti-theft mode<br>triggered |
| 1 | Signal A | Signal A |
| 2 | Signal X | Signal X |
| 3 | Signal B | Signal A |
| 4 | Signal A | — |

Figure 3:
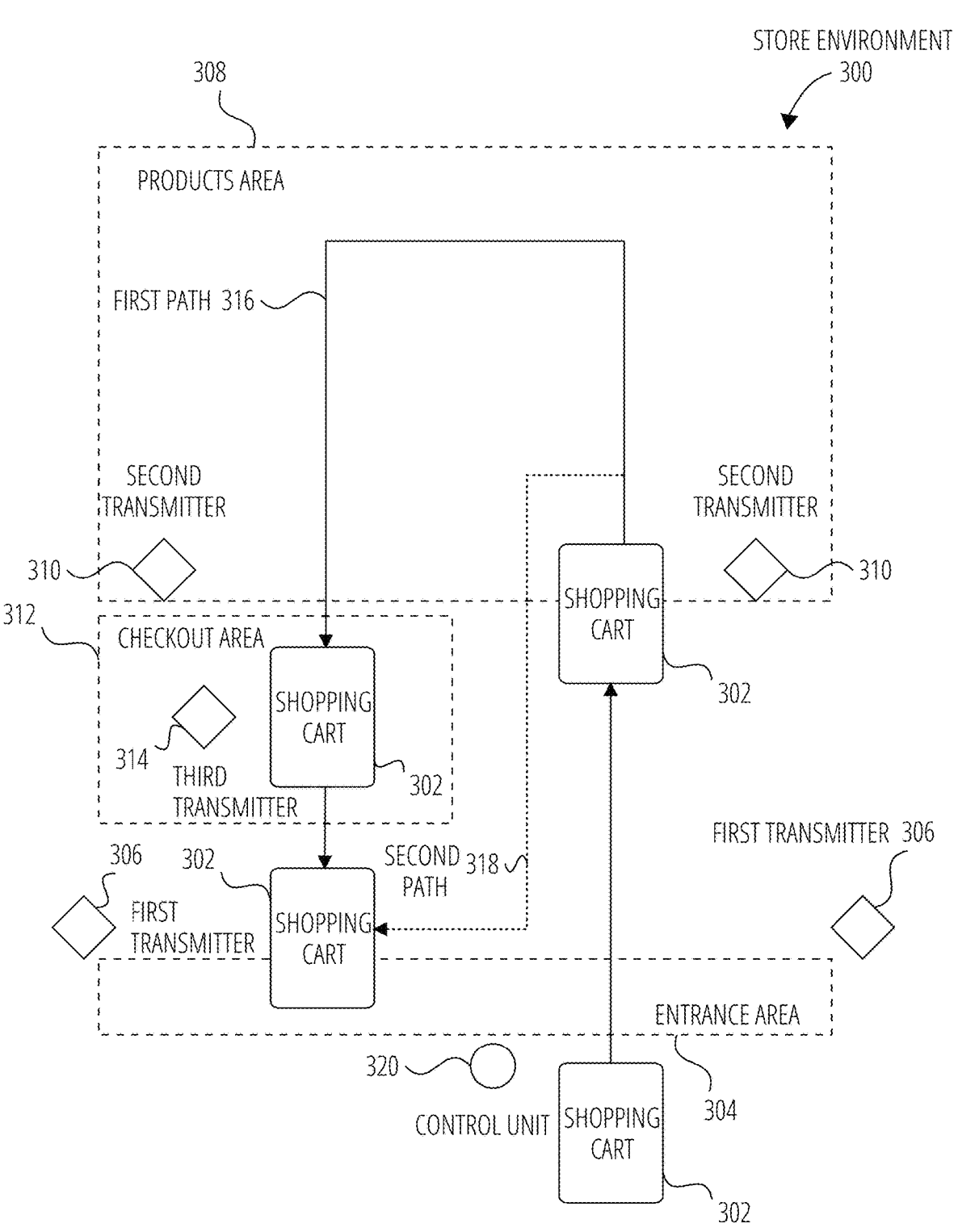
FIG. 3 shows a diagram of a process of facilitating prevention of theft of an item in a shopping container within a store environment, according to some examples.

FIG. 3 illustrates a process of facilitating prevention of theft of an item in a shopping container within a store environment 300, according to some examples. A shopping cart 302 that is fitted with a caster, such as the caster 100 of FIG. 1, is used as an example of a shopping container. However, it will be appreciated that one or more operations or aspects of the process of FIG. 3 may also be performed using other devices or systems that are configured for switching from a normal mode to an anti-theft mode. For example, a shopping container may be a shopping basket (e.g., a hand-carried basket) that is fitted with a controller that can enter an anti-theft mode to trigger an alarm (e.g., at the shopping basket or at a remote alarm system) instead of adjusting operation of a wheel.

Referring to FIG. 3, once the shopping cart 302 passes through an entrance area 304, the caster (e.g., the controller thereof) receives a first signal (e.g., a wireless 2.4 GHz A signal) from a first transmitter 306 (e.g., one of a plurality of first transmitters 306) located in or near the entrance area 304. In FIG. 3, the entrance area 304 is a combined entrance and exit area.

In some examples, the first transmitter 306 transmits the first signal so as to trigger the caster (e.g., the controller thereof) to start searching for the second signal. In some examples, the shopping cart 302 can linger beyond the entrance area 304 and outside of a products area 308 without receiving a second signal.

The shopping cart 302 then moves into the products area 308 where the caster (e.g., the controller thereof) receives the second signal (e.g., a wireless 2.4 GHz X signal) from a second transmitter 310 (e.g., one of a plurality of second transmitters 310) located in or near the products area 308.

If the shopping cart 302 then moves from the products area 308 into a checkout area 312, the caster (e.g., the controller thereof) receives a third signal (e.g., a wireless 2.4 GHz B signal) from a third transmitter 314 (e.g., one of a plurality of third transmitters 314) located in or near the checkout area 312. For example, the shopping cart 302 follows a first path 316 as shown in FIG. 3. If the first path 316 is followed, the shopping cart 302 can freely exit the store environment 300 via the entrance area 304 (after passing through the checkout area 312), without triggering the anti-theft mode. In some examples, a memory or status of the caster 100 is cleared or reset when the first signal is received again as the shopping cart 302 freely exits the store environment 300.

If the shopping cart 302 moves from the products area 308 back into the entrance area 304 without first visiting the checkout area 312 to receive the third signal, the caster (e.g., the controller thereof) automatically causes restraining of the wheel in response to receiving the first signal again in the entrance area 304. For example, the shopping cart 302 follows a second path 318 as shown in FIG. 3. If the second path 318 is followed, the shopping cart 302 is prevented from freely exiting the store environment 300 by activation of the restraining or locking mechanism of the caster. For example, the caster actuates a motor to create a high-friction or high-resistance state with respect to one or more wheels via a mechanical mechanism.

In some examples, the first transmitters 306 are installed in such a manner that every shopping cart entering or leaving the store environment 300 receives the first signal when moving through the entrance area 304 to enter or exit the store environment 300.

In some examples, the third transmitter 314 transmits the third signal to cause the caster (e.g., the controller thereof) to delete the stored second signal and start searching for a new second signal. In other words, the caster (e.g., the controller thereof) is programmed to start searching for a new second signal in response to receiving the third signal. For example, if the shopping cart 302 moves back into the products area 308 from the checkout area 312, the caster (e.g., the controller thereof) receives such a new second signal. This prevents the shopping cart 302 from leaving the store environment 300 without again passing through the checkout area 312 to cause the new second signal to be cleared by a new third signal. Thus, in some examples, if the second signal is not erased from the memory of the caster (e.g., the controller thereof), or if its status is not updated to reflect receipt of the third signal, and the shopping cart 302 leaves (or starts leaving) the store environment 300, the anti-theft mode will be triggered.

As mentioned, in some examples, an alarm can also be triggered automatically within the store environment 300 as part of, or in response to, the entering of the anti-theft mode. For example, the caster of the shopping cart 302 transmits an alarm signal (e.g., a wireless 2.4 GHZ alarm signal) to a control unit 320 installed in or near the entrance area 304. The control unit 320 is configured to receive the alarm signal wirelessly from the caster, process the alarm signal, and trigger the alarm in response thereto.

Figure 4:
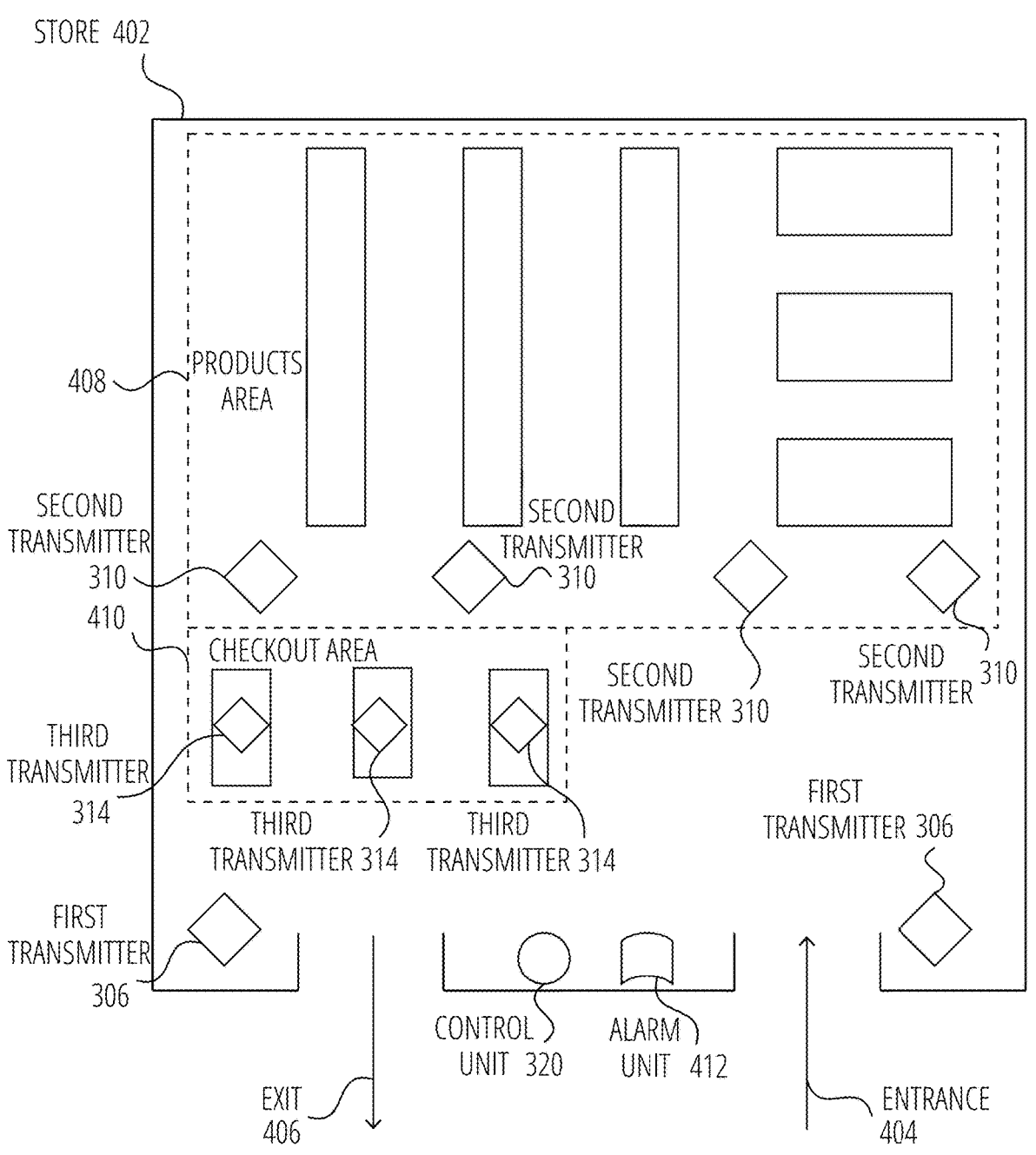
FIG. 4 shows a diagram of certain components of a system to facilitate prevention of theft of an item in a shopping container, wherein the components are installed in a store environment, according to some examples.

FIG. 4 illustrates components of a system for facilitating prevention of theft of an item in a shopping container, according to some examples. The system may also be referred to as a shopping container security system. The components are installed in a store environment associated with a store 402 (e.g., a supermarket, grocery store, convenience store, or retail store).

The store 402 has an entrance 404, an exit 406, a products area 408, and a checkout area 410, as indicated in FIG. 4. The system includes a plurality of the first transmitters 306 of FIG. 3, a plurality of the second transmitters 310 of FIG. 3, and a plurality of the third transmitters 314 of FIG. 3. The system also includes the control unit 320 of FIG. 3. In FIG. 4, the control unit 320 is communicatively coupled to an alarm unit 412.

Although not shown in FIG. 4, it is noted that a shopping container and/or a controller component (e.g., a shopping cart with a such as the caster 100 of FIG. 1) may also form part of the system of FIG. 4. It will be appreciated that the system may include a plurality of shopping containers that are configured to switch between a normal and anti-theft mode as described herein.

As an example, one of the first transmitters 306 can be installed at, above, or near the entrance 404 (e.g., RF transmitter mounted about 8 ft (about 2.4 m) above the floor), while another one of the first transmitters 306 is installed at, above, or near the exit 406 (e.g., RF transmitter mounted about 8 ft (about 2.4 m) above the floor). The second transmitters 310 can be spaced apart to cover the products area 408, or a boundary between the products area 408 and other areas (e.g., RF transmitters also installed at about 8 ft (about 2.4 m) above the floor) sufficiently to ensure that shopping containers traveling into or out of the products area 408 receive the second signal. The third transmitters 314 (e.g., RF transmitters) can be installed, for example, at, under, or near each checkout desk or counter in the checkout area 410, as depicted in FIG. 4. Furthermore, the control unit 320 and the alarm unit 412 can be installed near the entrance 404 and exit 406 (e.g., about 10 ft (3 m) above the floor).

From a signaling perspective, the system shown in FIG. 4 follows a similar process to the one described with reference to FIG. 3. Once a shopping container nears or passes through the entrance 404, its caster or controller receives the first signal (e.g., a wireless 2.4 GHz A signal) from one of the first transmitters 306. The shopping container may then move into the products area 408 where the caster or controller receives the second signal (e.g., a wireless 2.4 GHz X signal) from one or more of the second transmitters 310.

However, and as explained above, a customer may enter the store 402 and leave relatively quickly, without entering a main shopping area. For example, the products area 408 may be the main shopping area, while the store 402 also includes other areas where the customer can buy products or services, but these areas are not part of the main shopping area. These other areas can, for example, be part of a "foyer area" of the store 402 or a larger store environment.

A customer wishing to use these "other" shops or services quickly may not necessarily enter the products area 408 of the store 402 that includes the second transmitters 310. The configuration and installation of the system of FIG. 4 allows shopping containers to enter and exit such a "foyer area" without triggering the anti-theft mode, provided they do not venture beyond into the main shopping area (e.g., the products area 408). In some examples, this configuration ensures that customers using only services at or near an entrance area, that do not form part of a designated products area monitored via installation of the second transmitters 310, can do so without the inconvenience of, for example, a locked shopping cart or an audible alarm sounding from their shopping container. Where a customer follows such a path, the caster or controller of their shopping container thus receives only the first signal (e.g., the A signal) and therefore does not cause switching from the normal mode to the anti-theft mode.

Still referring to FIG. 4, if the shopping container does move into the products area 408 to receive the second signal and then into the checkout area 410, the caster or controller receives a third signal (e.g., a wireless 2.4 GHz B signal) from one or more of the third transmitters 314. As mentioned, the third signal may operate to cause the caster or controller to clear the stored second signal or to adjust its status accordingly.

If the shopping container moves from the products area 408 directly back out of the store 402 via the entrance 404 or via the exit 406 (without passing through the checkout area 410), the caster or controller does not receive the third signal following the second signal, and thus automatically causes the anti-theft mode to be activated. In this context, the entrance 404 and the exit 406 of FIG. 4 can both be regarded as being part of the "entrance area," where the entrance area is defined as an area in which the caster or controller receives the first signal.

In the installation as shown in FIG. 4, the transmitters are positioned and/or their ranges are set or adjusted such that the caster or controller of a shopping container does not receive two or more of the first signal, the second signal, or the third signal simultaneously. For example, when at or near the entrance 404 or the exit 406, the shopping container is too far from the checkout area 410 and the products area 408 to receive the second signal or the third signal. Similarly, when the shopping container is in the checkout area 410, it is not exposed to the first signal or the second signal, and when the shopping container is in the products area 408, it is not exposed to the first signal or the third signal.

Accordingly, in some examples, respective transmitters are placed within the store and/or specifically configured to ensure that the first signal, the second signal, the third signal, or any combination thereof are only received, for example, in the entrance area of the store, the products area of the store, and the checkout area of the store, respectively.

As mentioned, in some examples, an alarm can also be triggered automatically as part of, or in response to, the entering of the anti-theft mode. For example, the caster or controller of the shopping container transmits an alarm signal (e.g., a wireless 2.4 GHz alarm signal) to the control unit 320. The control unit 320 communicates an instruction to the alarm unit 412, which causes activation of a suitable alarm component, such as an audible alarm (e.g., siren) or visual alarm (e.g., flashing light). In some examples, the shopping container itself is fitted with an alarm component that is triggered when the anti-theft mode is entered.

The control unit 320 can also be communicatively coupled to other components, such as one or more video cameras (e.g., a closed-circuit television (CCTV) or other video surveillance system), or one or more other peripherals. For example, upon receiving the alarm signal, the control unit 320 transmits an instruction to a CCTV system to capture an incident by capturing or storing footage depicting events in an area that includes the entrance 404 and/or the exit 406.

As mentioned, the first signal, the second signal, the third signal, or any combination thereof have a frequency of about 2.4 GHz or about 5.8 GHz. In some examples, the use of such frequency signals eliminates the need to install entrance loops to detect proximity of a shopping container.

In some examples, a controller component (e.g., the controller 104 of the caster 100 of FIG. 1) is configured such that after entering the anti-theft mode, a specific unlock signal or reset signal is provided before it transitions back to the normal mode. For example, the control unit 320 of FIG. 3 or FIG. 4 can transmit the unlock signal or reset signal (e.g., a 2.4 GHZ signal), which the controller component processes and responds to by, for example, actuating a wheel-restraining mechanism to allow free rotation of a wheel, or deactivating an alarm component on the shopping container. For example, an operator of the shopping container security system can provide user input to cause transmission of the unlocking signal after checking and confirming that a suspect has been apprehended, that an incident has been captured, or that the incident was a false alarm (e.g., the shopping container is empty).

In some examples, the unlocking or resetting process additionally or alternatively includes activating a reset controller. For example, the system may include a reset controller in the form of a remote control that can be used to wirelessly reset the controller on the shopping container. The reset controller can communicate with the control unit which in turn communicates with the controller or on the shopping container, or can communicate directly with the controller on the shopping container.

In some examples, the resetting or unlocking operation serves to cause an alarm of the store to be deactivated or disabled. For example, the control unit 320 receives a reset signal from the reset controller and causes the alarm unit 412 to be deactivated.

As mentioned, examples described herein may be applied to shopping carts or other types of shopping containers. For example, while examples described herein discuss a mobility control unit, such as a caster, that is mounted to or incorporated in a wheeled shopping cart, a caster or other mobility control unit can be mounted to or incorporated in a wheeled hand cart or a wheeled stock replenishment container, and methods and systems of the present disclosure can be applied to or performed using such a container.

Example Scenarios

Three example scenarios are discussed below with reference to a customer using a shopping cart with a caster (e.g., the caster 100). It will be appreciated that these scenarios are non-limiting examples. Similar scenarios may, for example, occur where a customer is carrying a shopping basket that is fitted with a controller that can enter an anti-theft mode.

In a first scenario, a customer pushing a shopping cart with a caster (e.g., the caster 100) enters a store and the first signal is received, but before entering a products area (meaning that the second signal has not yet been received), the customer realizes that they forgot a coupon, and directly exits the store. Exiting the store clears the memory of the caster and the shopping cart remains in a normal mode (e.g., in which all wheels can freely rotate) while the customer returns to their car with their shopping cart.

In a second scenario, a customer enters the store, and the first signal is received at the shopping cart. The customer then enters the products area, and the second signal is received. When the customer attempts to exit the store without passing through the checkout area, and without receiving the third signal, the first signal is received again, and the caster enters an anti-theft mode, preventing (or hindering) the shopping cart from further translation. An audio and visual alarm is triggered to warn of the potential attempted theft, and a time-stamped video of the attempted robbery is stored in a local computing system or cloud-based storage.

In a third scenario, a customer enters the store, and the first signal is received at the shopping cart. The customer then enters the products area, and the second signal is received. The customer then passes through the checkout area, and the third signal is received. The first signal is received once the cart exits the store. The caster remains in the normal mode.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" may include an amount or value that is approximately the stated amount or value. As used herein, the term "about" may include an amount or value that is near the stated amount or value by 10%, 5%, or 1%, including increments therein. As used herein, the term "about" in reference to a percentage may include an amount or value that is greater or less than the stated percentage by 10%, 5%, or 1%, including increments therein.

As used herein, a "processor" may include, for example, data processors such as a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), a Quantum Processing Unit (QPU), a Tensor Processing Unit (TPU), a Neural Processing Unit (NPU), a Field Programmable Gate Array (FPGA), another processor, or any suitable combination thereof. The term "processor" may include multi-core processors that may comprise two or more independent processors (sometimes referred to as "cores") that may execute instructions contemporaneously. These cores can be homogeneous (e.g., all cores are identical, as in multicore CPUs) or heterogeneous (e.g., cores are not identical, as in many modern GPUs and some CPUs). In addition, the term "processor" may encompass systems with a distributed architecture, where multiple processors are interconnected to perform tasks in a coordinated manner. This includes, for example, cluster computing, grid computing, and cloud computing infrastructures. Furthermore, the processor may be embedded in a device to control specific functions of that device, such as in an embedded system, or it may be part of a larger system, such as a server in a data center. The processor may also be virtualized in a software-defined infrastructure, where the processor's functions are emulated in software.

As used herein, the phrases "at least one," "one or more," and "and/or" are open-ended expressions that are both conjunctive and disjunctive in operation. For example, each of the expressions "at least one of A, B, and C", "at least one of A, B, or C", "one or more of A, B, and C", "one or more of A, B, or C" and "A, B, and/or C" means A alone, B alone, C alone, A and B together, A and C together, B and C together, or A, B, and C together.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Figure 5:
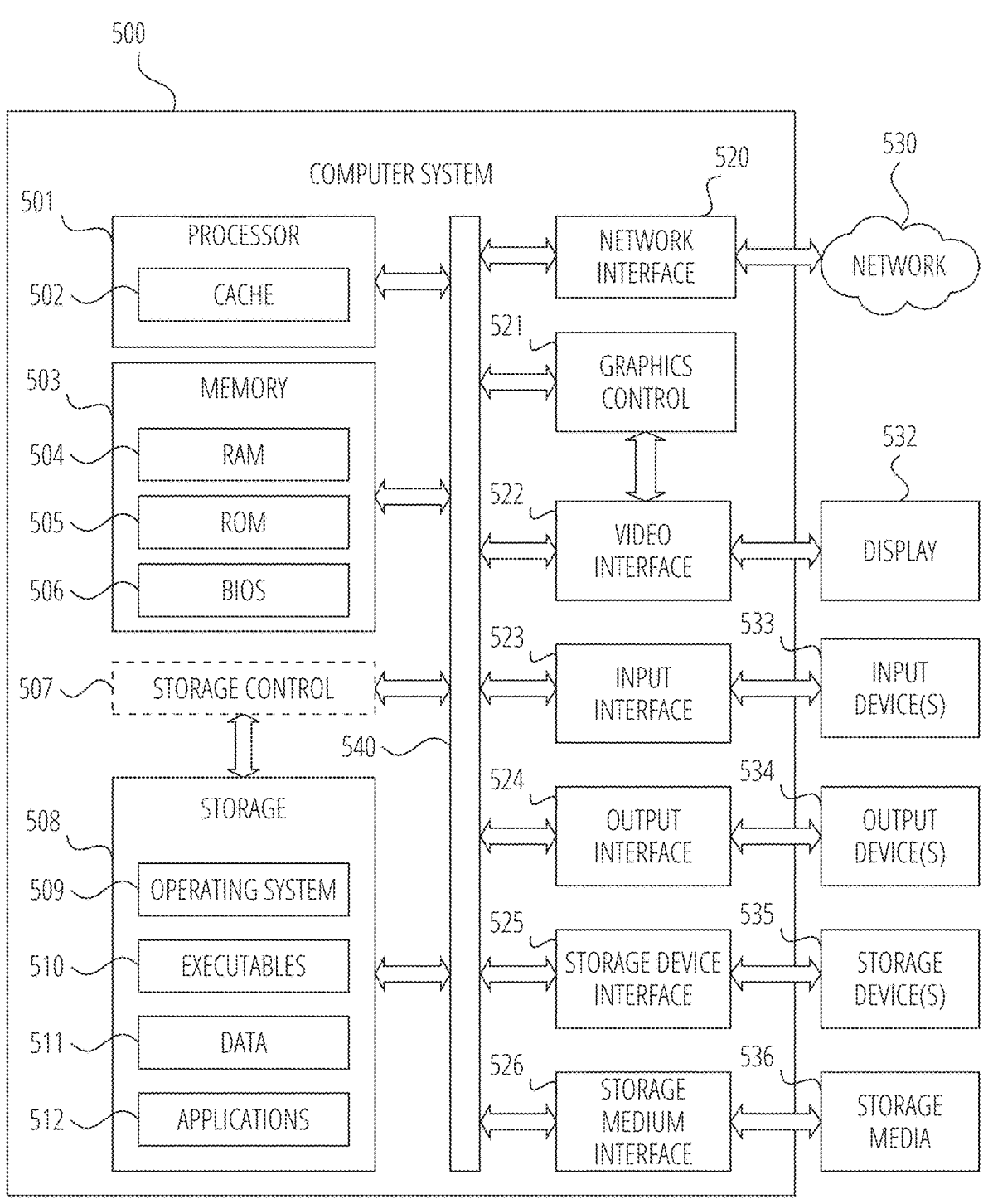
FIG. 5 is a block diagram of a machine that can be used to implement methods or systems described herein, according to some examples.

FIG. 5 shows a machine that includes a computer system 500 (e.g., a processing or computing system), according to some examples, within which a set of instructions can execute for causing a device to perform or execute one or more of the aspects and/or methodologies of the present disclosure. The components in FIG. 5 are examples only and are not intended to limit the scope of use or functionality of any hardware, software, embedded logic component, or a combination of two or more such components implementing particular examples.

The computer system 500 may include one or more processors 501, a memory 503, and a storage 508 that communicate with each other, and with other components, via a bus 540. The bus 540 may also link a display 532, one or more input device(s) 533 (which may, for example, include a keypad, a keyboard, a mouse, a stylus, etc.), one or more output device(s) 534, one or more storage device(s) 535, and various tangible storage media 536. These elements may interface directly or via one or more interfaces or adaptors to the bus 540. For instance, the storage media 536 can interface with the bus 540 via storage medium interface 526. The computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

The computer system 500 includes one or more processors 501 that carry out functions. A computer system 500 optionally contains a cache memory unit 502 for temporary local storage of instructions, data, or computer addresses. The processor 501 is configured to assist in execution of computer readable instructions. The computer system 500 may provide functionality for the components depicted in FIG. 5 as a result of the processor 501 executing non-transitory, processor-executable instructions embodied in one or more tangible computer-readable storage media, such as memory 503, storage 508, storage device(s) 535, and/or storage media 536. The computer-readable media may store software that implements particular examples, and the processor 501 may execute the software. The memory 503 may read the software from one or more other computer-readable media (such as storage device(s) 535) or from one or more other sources through a suitable interface, such as a network interface 520. The software may cause the processor 501 to carry out one or more processes or one or more steps of one or more processes described or illustrated herein. Carrying out such processes or steps may include defining data structures stored in memory 503 and modifying the data structures as directed by the software.

The memory 503 may include various components (e.g., machine readable media) including, but not limited to, a random access memory component (e.g., RAM 504) (e.g., static RAM (SRAM), dynamic RAM (DRAM), ferroelectric random access memory (FRAM), phase-change random access memory (PRAM), etc.), a read-only memory component (e.g., ROM 505), and any combinations thereof. ROM 505 may act to communicate data and instructions unidirectionally to the processor 501, and RAM 504 may act to communicate data and instructions bidirectionally with the processor 501. ROM 505 and RAM 504 may include any suitable tangible computer-readable media. In one example, a basic input/output system (e.g., BIOS 506), including basic routines that help to transfer information between elements within the computer system 500, such as during start-up, may be stored in the memory 503.

The storage 508 is connected bidirectionally to the processor 501, optionally through a storage control 507. The storage 508 provides additional data storage capacity and may also include any suitable tangible computer-readable media described herein. The storage 508 may be used to store an operating system 509, executables 510, data 511, applications 512, and the like. The storage 508 can also include an optical disk drive, a solid-state memory device (e.g., flash-based systems), or a combination of any of the above. Information in storage 508 may, in appropriate cases, be incorporated as virtual memory in the memory 503.

In one example, the storage device(s) 535 may be removably interfaced with the computer system 500 (e.g., via an external port connector (not shown)) via a storage device interface 525. Particularly, the storage device(s) 535 and an associated machine-readable medium may provide non-volatile and/or volatile storage of machine-readable instructions, data structures, program modules, and/or other data for the computer system 500. In one example, software may reside, completely or partially, within a machine-readable medium on the storage device(s) 535. In another example, software may reside, completely or partially, within the processor 501.

In some examples, the bus 540 connects a wide variety of subsystems. Herein, reference to a bus may encompass one or more digital signal lines serving a common function, where appropriate. The bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

The computer system 500 may also include or be connected to an input device(s) 533. In one example, a user of the computer system 500 may enter commands and/or other information into the computer system 500 via the input device(s) 533. Examples of input device(s) 533 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some examples, the input device is a Kinect, Leap Motion, or the like. Input device(s) 533 may be interfaced to the bus 540 via any of a variety of input interfaces (e.g., input interface 523) including, but not limited to, serial, parallel, game port, USB, FIREWIRE, THUNDERBOLT, or any combination of the above.

In particular examples, when the computer system 500 is connected to a network 530, the computer system 500 may communicate with other devices, such as mobile devices and enterprise systems, distributed computing systems, cloud storage systems, cloud computing systems, and the like, connected to the network 530. Communications to and from the computer system 500 may be sent through the network interface 520. For example, the network interface 520 may receive incoming communications (such as requests or responses from other devices) in the form of one or more packets (such as Internet Protocol (IP) packets) from the network 530, and the computer system 500 may store the incoming communications in memory 503 for processing. The computer system 500 may similarly store outgoing communications (such as requests or responses to other devices) in the form of one or more packets in memory 503 and communicated to the network 530 from the network interface 520. The computer system 500 may access these communication packets stored in memory 503 for processing.

Examples of the network interface 520 include, but are not limited to, a network interface card, a modem, and any combination thereof. Examples of a network 530 or network segment include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as the network 530, may employ a wired and/or a wireless mode of communication. In general, any network topology may be used.

Information and data can be displayed through a display 532. Examples of the display 532 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 532 can interface to the processor 501, memory 503, and storage 508, as well as other devices, such as the input device(s) 533, via the bus 540. The display 532 is linked to the bus 540 via a video interface 522, and transport of data between the display 532 and the bus 540 can be controlled via a graphics control 521. In some examples, the display is a video projector. In some examples, the display is a head-mounted display (HMD) such as an augmented reality (AR) or virtual reality (VR) headset. In further examples, suitable headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further examples, the display is a combination of devices such as those disclosed herein.

In addition to a display, the computer system 500 may include one or more other peripheral output device(s) 534 including, but not limited to, an audio speaker, a printer, a storage device, and any combinations thereof. Such peripheral output devices may be connected to the bus 540 via an output interface 524. Examples of the output interface 524 include, but are not limited to, a serial port, a parallel connection, a USB port, a FIREWIRE port, a THUNDER-BOLT port, and any combinations thereof.

In addition or as an alternative, the computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses suitable combinations of hardware, software, or both.

Those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the examples disclosed herein may be implemented or performed with a processor or combinations of processors designed to perform the functions described herein.

The operations of a method or algorithm described in connection with the examples disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, examples of suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various examples, include those with booklet, slate, and convertible configurations, known to those of skill in the art.

In some examples, a computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, Free- BSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some examples, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox®, Nintendo® Wii®, Nintendo® Wii U®, and Ouya®.

Non-Transitory Computer Readable Storage Medium

In some examples, platforms, systems, media, and/or methods disclosed herein include one or more non-transitory computer readable storage media encoded with a program including instructions executable by the operating system of an optionally networked computing device. In further examples, a computer readable storage medium is a tangible component of a computing device. In still further examples, a computer readable storage medium is optionally removable from a computing device. In some examples, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some examples, platforms, systems, media, and/or methods disclosed herein include at least one computer program, or use of the same. A computer program includes a sequence of instructions, executable by one or more processors, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some examples, a computer program comprises one sequence of instructions. In some examples, a computer program comprises a plurality of sequences of instructions. In some examples, a computer program is provided from one location. In other examples, a computer program is provided from a plurality of locations. In various examples, a computer program includes one or more software modules. In various examples, a computer program includes, in part or in whole, one or more web applications, one or more mobile applications, one or more standalone applications, one or more web browser plug-ins, extensions, add-ins, or add-ons, or combinations thereof.

Standalone Application

In some examples, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some examples, a computer program includes one or more executable complied applications.

Web Browser Plug-In

In some examples, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some examples, the toolbar comprises one or more web browser extensions, add-ins, or add-ons. In some examples, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some examples, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some examples, platforms, systems, media, or methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various examples, a software module comprises a file, a section of code, a programming object, a programming structure, or combinations thereof. In further various examples, a software module comprises a plurality of files, a plurality of sections of code, a plurality of programming objects, a plurality of programming structures, or combinations thereof. In various examples, the one or more software modules comprise, by way of non-limiting examples, a web application, a mobile application, and a standalone application. In some examples, software modules are in one computer program or application. In other examples, software modules are in more than one computer program or application. In some examples, software modules are hosted on one machine. In other examples, software modules are hosted on more than one machine. In further examples, software modules are hosted on a distributed computing platform such as a cloud computing platform. In some examples, software modules are hosted on one or more machines in one location. In other examples, software modules are hosted on one or more machines in more than one location.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a computer-implemented method of facilitating prevention of theft of an item in a shopping container, the computer-implemented method comprising: receiving, by a controller attached to the shopping container, a first signal from a first transmitter upon entry of the shopping container into a first area within a store; after receiving the first signal, receiving, by the controller, a second signal from a second transmitter upon entry of the shopping container into a second area within the store; after receiving the second signal, receiving, by the controller, the first signal again without having received a third signal associated with a third area within the store, wherein the first signal, the second signal, and the third signal are different signals; and in response to receiving the first signal again without having received the third signal after receipt of the second signal, automatically switching, by the controller, from a normal mode to an anti-theft mode associated with the controller.

In Example 2, the subject matter of Example 1 includes, wherein the shopping container is a shopping cart, the controller is provided by a caster of the shopping cart, and switching to the anti-theft mode comprises causing rotation of a wheel of the shopping cart to be restrained by the caster.

In Example 3, the subject matter of any of Examples 1-2 includes, wherein the first area is an entrance area, the second area is a products area, and the third area is a checkout area.

In Example 4, the subject matter of any of Examples 1-3 includes, wherein the first signal, the second signal, and the third signal have a same frequency.

In Example 5, the subject matter of any of Examples 1-4 includes, wherein the first signal, the second signal, and the third signal are RF signals.

In Example 6, the subject matter of any of Examples 1-5 includes, wherein the controller is configured to remain in the normal mode in response to receiving the first signal again after having received the third signal upon entry of the shopping container into the third area within the store.

In Example 7, the subject matter of any of Examples 1-6 includes, wherein the controller is configured to start searching for a new second signal in response to receiving the third signal upon entry of the shopping container into the third area within the store.

In Example 8, the subject matter of any of Examples 1-7 includes, wherein the third signal is received from a third transmitter, and the computer-implemented method further comprises: adjusting a range of at least one of the first transmitter, the second transmitter, or the third transmitter to prevent the controller from receiving two or more of the first signal, the second signal, or the third signal simultaneously.

In Example 9, the subject matter of any of Examples 1-8 includes, wherein switching to the anti-theft mode comprises, causing, by the controller, transmission of an alarm signal to trigger an alarm.

In Example 10, the subject matter of any of Examples 1-9 includes, wherein switching to the anti-theft mode comprises, causing, by the controller, transmission of an alarm signal to trigger capturing of an incident.

In Example 11, the subject matter of Example 10 includes, wherein the alarm signal is transmitted wirelessly from the controller attached to the shopping container to a control unit installed within the store, and the control unit causes capturing of the incident via at least one video camera installed within the store.

Example 12 is a system to facilitate prevention of theft of an item in a shopping container, the system comprising: a controller attached or attachable to the shopping container; and at least one memory storing instructions that, when executed by the controller, cause the controller to perform operations comprising: receiving a first signal from a first transmitter upon entry of the shopping container into a first area within a store; after receiving the first signal, receiving a second signal from a second transmitter upon entry of the shopping container into a second area within the store; after receiving the second signal, receiving the first signal again without having received a third signal associated with a third area within the store, wherein the first signal, the second signal, and the third signal are different signals; and in response to receiving the first signal again without having received the third signal after receipt of the second signal, automatically switching from a normal mode to an anti-theft mode associated with the controller.

In Example 13, the subject matter of Example 12 includes, wherein the shopping container is a shopping cart, the controller is provided by a caster of the shopping cart, and switching to the anti-theft mode comprises causing rotation of a wheel of the shopping cart to be restrained by the caster.

In Example 14, the subject matter of any of Examples 12-13 includes, wherein the first area is an entrance area, the second area is a products area, and the third area is a checkout area.

In Example 15, the subject matter of any of Examples 12-14 includes, wherein the first signal, the second signal, and the third signal have a same frequency.

In Example 16, the subject matter of any of Examples 12-15 includes, wherein the system further comprises the first transmitter and the second transmitter.

In Example 17, the subject matter of any of Examples 12-16 includes, wherein the controller is configured to remain in the normal mode in response receiving the first signal again after having received the third signal upon entry of the shopping container into the third area within the store.

In Example 18, the subject matter of any of Examples 12-17 includes, wherein the controller is configured to start searching for a new second signal in response to receiving the third signal upon entry of the shopping container into the third area within the store.

In Example 19, the subject matter of any of Examples 12-18 includes, wherein the system further comprises a third transmitter to transmit the third signal upon entry of the shopping container into the third area within the store, and a range of at least one of the first transmitter, the second transmitter, or the third transmitter is set to prevent the controller from receiving two or more of the first signal, the second signal, or the third signal simultaneously.

Example 20 is one or more non-transitory computer-readable storage media storing instructions that, when executed by at least one processor of a controller associated with a shopping container, cause the controller to perform operations comprising: receiving a first signal from a first transmitter upon entry of the shopping container into a first area within a store; after receiving the first signal, receiving a second signal from a second transmitter upon entry of the shopping container into a second area within the store; after receiving the second signal, receiving the first signal again without having received a third signal associated with a third area within the store, wherein the first signal, the second signal, and the third signal are different signals; and in response to receiving the first signal again without having received the third signal after receipt of the second signal, automatically switching from a normal mode to an anti-theft mode associated with the controller.

Example 21 is a computer-implemented system comprising: a digital processing device comprising: at least one processor, an operating system configured to perform executable instructions, a memory, and a computer program including instructions executable by the digital processing device to create an application for facilitating prevention of theft of an item in a shopping cart, wherein the shopping cart comprises a mobility control unit comprising a signal receiving device communicably coupled to a controller, wherein the controller actuates a motor to lock or unlock, or restrain or allow, rotation of a wheel, the application comprising: a module receiving a first signal via the signal receiving device from a first sensor/transmitter when the shopping cart enters the store; a module receiving a second signal via the signal receiving device from a second sensor/transmitter when the shopping cart enters a products area within the store; a module receiving a third signal via the signal receiving device from a third sensor/transmitter when the shopping cart enters a checkout area in the store; and a module receiving an instruction to the mobility control unit to lock or restrain the rotation of the wheel if the first signal is received again.

Example 22 is one or more non-transitory computer-readable storage media encoded with a computer program including instructions executable by a processor to create an application for facilitating prevention of theft of an item in a shopping cart, wherein the shopping cart comprises a mobility control unit comprising a signal receiving device communicably coupled to a controller, wherein the controller actuates a motor to lock or unlock, or restrain or allow, rotation of a wheel, the application comprising: a module receiving a first signal via the signal receiving device from a first sensor/transmitter when the shopping cart enters the store; a module receiving a second signal via the signal receiving device from a second sensor/transmitter when the shopping cart enters a products area within the store; a module receiving a third signal via the signal receiving device from a third sensor/transmitter when the shopping cart enters a checkout area in the store; and a module receiving an instruction to the mobility control unit to lock or restrain the rotation of the wheel if the first signal is received again.

Example 23 is a system to facilitate prevention of theft of an item in a shopping cart, wherein the shopping cart comprises a mobility control unit comprising a signal receiving device communicably coupled to a controller, the system comprising: a first sensor/transmitter for transmitting a first signal to the mobility control unit when the shopping cart enters the store; a second sensor/transmitter for transmitting a second signal to the mobility control unit when the shopping cart enters a products area within the store; and a third sensor/transmitter for transmitting a third signal to the mobility control unit when the shopping cart enters a checkout area in the store.

Example 24 is a computer-implemented method of facilitating prevention of theft of an item in a shopping cart, wherein the shopping cart comprises a mobility control unit comprising a signal receiving device communicably coupled to a controller, where the controller actuates a motor to lock or unlock, or restrain or allow, rotation of a wheel, the method comprising: receiving, by the controller, a first signal from a first sensor/transmitter when the shopping cart enters the store; receiving, by the controller, a second signal via the signal receiving device from a second sensor/transmitter when the shopping cart enters a products area within the store; and receiving, by the controller, a third signal from a third sensor/transmitter when the shopping cart enters a checkout area in the store; or transmitting, by the controller, an instruction to the mobility control unit to lock or restrain the rotation of the wheel if the first signal is received again.

Example 25 is a computer program including instructions executable by a digital processing device to create an application for facilitating prevention of theft of an item in a shopping cart, wherein the shopping cart comprises a mobility control unit comprising a signal receiving device communicably coupled to a controller, wherein the controller actuates a motor to lock or unlock, or restrain or allow, rotation of a wheel, the application comprising: a module receiving a first signal via the signal receiving device from a first sensor/transmitter when the shopping cart enters the store; a module receiving a second signal via the signal receiving device from a second sensor/transmitter when the shopping cart enters a products area within the store; a module receiving a third signal via the signal receiving device from a third sensor/transmitter when the shopping cart enters a checkout area in the store; and a module receiving an instruction to the mobility control unit to lock or restrain, the rotation of the wheel if the first signal is received again.

Example 26 is a method of facilitating prevention of theft of an item in a shopping cart, wherein the shopping cart comprises a mobility control unit to lock or unlock, or restrain or allow, rotation of a wheel of the mobility control unit, the computer-implemented method comprising: receiving, by a controller of the mobility control unit, a first signal from a first transmitter upon entry of the shopping cart into an entrance area within a store; after receiving the first signal, receiving, by the controller, a second signal from a second transmitter upon entry of the shopping cart into a products area within the store; after receiving the second signal, receiving, by the controller, the first signal again without having received a third signal associated with a checkout area within the store, wherein the first signal, the second signal, and the third signal are different signals; and in response to receiving the first signal again without having received the third signal after receipt of the second signal, automatically causing, by the controller, locking or restraining of the rotation of the wheel.

In Example 27, the subject matter of any of Examples 21-26, wherein the mobility control unit comprises a caster that includes the wheel.

Example 28 is at least one machine-readable medium including instructions that, when executed by processing circuitry, cause the processing circuitry to perform operations to implement any of Examples 1-27.

Example 29 is an apparatus comprising means to implement any of Examples 1-27.

Example 30 is a system to implement any of Examples 1-27.

Example 31 is a method to implement any of Examples 1-27.

What is claimed is:

1. A computer-implemented method of facilitating prevention of theft of an item in a shopping container, the computer-implemented method comprising:
receiving, by a controller attached to the shopping container, a first signal from a first transmitter upon entry of the shopping container into a first area within a store;
after receiving the first signal, receiving, by the controller, a second signal from a second transmitter upon entry of the shopping container into a second area within the store;
after receiving the second signal, receiving, by the controller, the first signal again without having received a third signal from a third transmitter associated with a third area within the store, wherein the first signal, the second signal, and the third signal are different signals; and
in response to receiving the first signal again without having received the third signal after receipt of the second signal, automatically switching, by the controller, from a normal mode to an anti-theft mode associated with the controller,
wherein the computer-implemented method further comprises adjusting a range of at least one of the first transmitter, the second transmitter, or the third transmitter to prevent the controller from receiving two or more of the first signal, the second signal, or the third signal simultaneously.

2. The computer-implemented method of claim 1, wherein the shopping container is a shopping cart, the controller is provided by a caster of the shopping cart, and switching to the anti-theft mode comprises causing rotation of a wheel of the shopping cart to be restrained by the caster.

3. The computer-implemented method of claim 1, wherein the first area is an entrance area, the second area is a products area, and the third area is a checkout area.

4. The computer-implemented method of claim 1, wherein the first signal, the second signal, and the third signal have a same frequency.

5. The computer-implemented method of claim 4, wherein the first signal, the second signal, and the third signal are radio frequency (RF) signals.

6. The computer-implemented method of claim 1, wherein the controller is configured to remain in the normal mode in response to receiving the first signal again after having received the third signal upon entry of the shopping container into the third area within the store.

7. The computer-implemented method of claim 1, wherein the controller is configured to start searching for a new second signal in response to receiving the third signal upon entry of the shopping container into the third area within the store.

8. The computer-implemented method of claim 1, wherein switching to the anti-theft mode comprises, causing, by the controller, transmission of an alarm signal to trigger an alarm.

9. The computer-implemented method of claim 1, wherein switching to the anti-theft mode comprises, causing, by the controller, transmission of an alarm signal to trigger capturing of an incident.

10. The computer-implemented method of claim 9, wherein the alarm signal is transmitted wirelessly from the controller attached to the shopping container to a control unit installed within the store, and the control unit causes capturing of the incident via at least one video camera installed within the store.

11. A system to facilitate prevention of theft of an item in a shopping container, the system comprising:

a controller attached or attachable to the shopping container; and at least one memory storing instructions that, when executed by the controller, cause the controller to perform operations comprising:

receiving a first signal from a first transmitter upon entry of the shopping container into a first area within a store;

after receiving the first signal, receiving a second signal from a second transmitter upon entry of the shopping container into a second area within the store;

after receiving the second signal, receiving the first signal again without having received a third signal associated with a third area within the store, wherein the first signal, the second signal, and the third signal are different signals; and in response to receiving the first signal again without having received the third signal after receipt of the second signal, automatically switching from a normal mode to an anti-theft mode associated with the controller, wherein the system further comprises a third transmitter to transmit the third signal upon entry of the shopping container into the third area within the store, and a range of at least one of the first transmitter, the second transmitter, or the third transmitter is set to prevent the controller from receiving two or more of the first signal, the second signal, or the third signal simultaneously.

12. The system of claim 11, wherein the shopping container is a shopping cart, the controller is provided by a caster of the shopping cart, and switching to the anti-theft mode comprises causing rotation of a wheel of the shopping cart to be restrained by the caster.

13. The system of claim 11, wherein the first area is an entrance area, the second area is a products area, and the third area is a checkout area.

14. The system of claim 11, wherein the first signal, the second signal, and the third signal have a same frequency.

15. The system of claim 11, wherein the system further comprises the first transmitter and the second transmitter.

16. The system of claim 11, wherein the controller is configured to remain in the normal mode in response receiving the first signal again after having received the third signal upon entry of the shopping container into the third area within the store.

17. The system of claim 11, wherein the controller is configured to start searching for a new second signal in response to receiving the third signal upon entry of the shopping container into the third area within the store.

18. One or more non-transitory computer-readable storage media storing instructions that, when executed by at least one processor of a controller associated with a shopping container, cause the controller to perform operations comprising:

receiving a first signal from a first transmitter upon entry of the shopping container into a first area within a store;

after receiving the first signal, receiving a second signal from a second transmitter upon entry of the shopping container into a second area within the store;

after receiving the second signal, receiving the first signal again without having received a third signal from a third transmitter associated with a third area within the store, the third transmitter provided to transmit the third signal upon entry of the shopping container into the third area within the store, wherein the first signal, the second signal, and the third signal are different signals; and in response to receiving the first signal again without having received the third signal after receipt of the second signal, automatically switching from a normal mode to an anti-theft mode associated with the controller, wherein a range of at least one of the first transmitter, the second transmitter, or the third transmitter is set to prevent the controller from receiving two or more of the first signal, the second signal, or the third signal simultaneously.

* * * * *